Feb. 27, 1945.  E. TERRAY  2,370,208
GARDENING TOOL
Filed Sept. 28, 1943
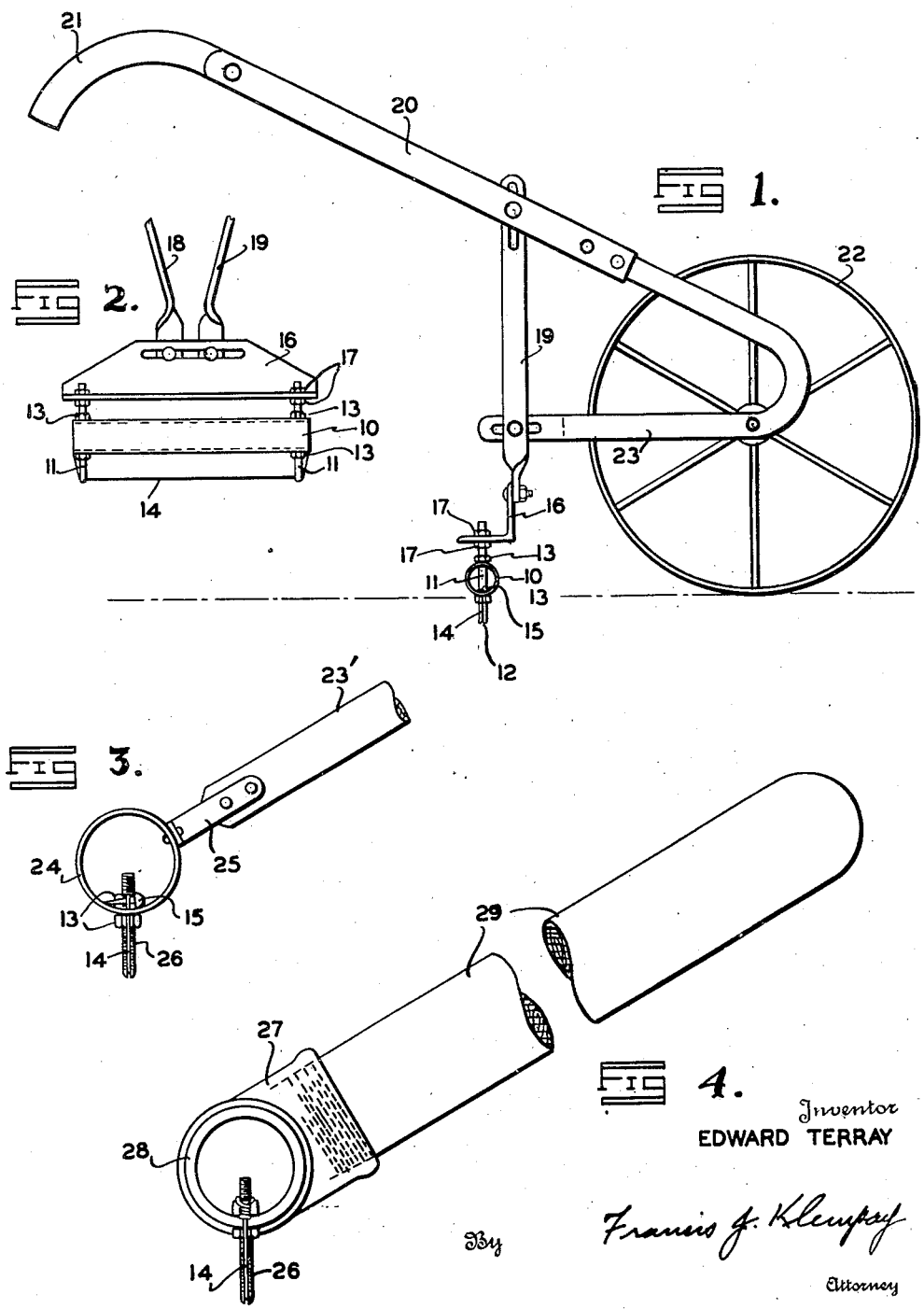
Inventor
EDWARD TERRAY Patented Feb. 27, 1945

2,370,208

UNITED STATES PATENT OFFICE 2,370,208

GARDENING TOOL

Edward Terray, Hubbard, Ohio

Application September 28, 1943, Serial No. 504,125

8 Claims. (Cl. 97—63)

This invention relates to gardening tools and more particularly to improved devices for cultivating and removing weeds and other undesirable plants and growths from the soil. The primary object of the invention is the provision of improved implements for the purposes stated which are light in weight, economical to construct, and which are operative manually to carry out the stated functions with substantially less effort than has heretofore been required in the use of devices designed for comparable purposes while yet effecting more uniform and better results in the cultivating and weed removing process.

Gardening authorities are now pretty well agreed that in substantially all cases arising in gardening practice cultivation of the soil about growing plants should be shallow. This is so because in the final analysis the main purposes in tilling the soil about growing plants are to remove or otherwise kill weeds and other undesirable plants, loosen and break up the hardened crust soil caused by beating rains thereby conditioning the soil for absorption and retention of water during subsequent rainfalls, and the exposing of destructive grubs for subsequent removal by the birds. Shallow cultivation satisfies all these requirements while, on the other hand, uncontrolled deep tilling of the soil results in the possibility of damage to the root system of the desired plants and the loosening of the soil about the roots and tubers of the desired plants which in all cases is wholly undesirable. The present invention provides tools for the controlled shallow cultivation of soils which may be manually employed with extreme ease and which effectively eliminates undesirable plants from the soil by removing such plants bodily from the same.

The above general objects are attained, in accordance with the principles of the invention, by employing a thin taut knife-like cutter which is arranged to be drawn laterally through the soil a controlled interval below the upper surface thereof. To provide for such control and to facilitate the movement of the tool over and through the ground being worked there is provided a rounded supporting and guiding member of substantial size which is adapted to move over the top surface of the ground and in contact therewith and depending from this member are the elements which support the cutting element in proper position below the top surface of the ground. Another object of the invention therefore is the provision of an improved construction for a gardening tool employing a length of thin taut wire or strip adapted to move laterally through the soil being worked whereby the depth of penetration of the wire or strip is controlled and the movement of the tool over and through the soil may be accomplished with less effort.

A further object of the invention is the provision in a gardening tool of the type employing a taut wire or band for movement laterally through the soil of an improved arrangement for carrying the wire or band and for maintaining the same in tightly stretched condition.

Another object of the invention is the provision of an improved garden cultivator of the wheeled type. In the operation of hand cultivators of the conventional wheeled type considerable effort must be expended not only in moving the tool in a forward direction but also in maintaining the vertical alignment of the assemblage so that the line of thrust is coincident with the general plane of the wheel and tilling tool. In accordance with the present invention the wheeled assemblage possesses substantially better inherent vertical stability when the tool of the invention is employed since the transversely extending supporting and guiding member above described tends to maintain the vertical position of the cultivator.

The above and other objects and advantages of the invention will become apparent upon consideration of the following detailed specification and the accompanying drawing wherein there is specifically disclosed certain preferred embodiments of the invention.

In the drawing:

Figure 1 is a side view of a gardening tool constructed in accordance with the principles of the invention, the tool being illustrated as applied to a wheel hand garden cultivator of conventional design;

Figure 2 is an end view of the tool of Figure 1;

Figure 3 is a side view of a gardening tool constructed according to the invention, illustrating the manner in which the same may be supported from a conventional long handle; and Figure 4 is a modification of the tool of Figure 3.

In Figures 1 and 2 reference numeral 10 indicates a tubular member preferably constructed of light gauge steel and preferably having a rounded cross-sectional shape as shown. Extending diametrically through the member 10 and aligned longitudinally with respect to the principal axis of the member 10 is a pair of threaded studs 11 positioned adjacent the ends of the member 10 as shown. The lower ends of studs 11 are rounded and grooved transversely as shown at 12 and threaded nuts 13 positioned on opposite sides of the member 10 serve to rigidly hold the studs 11 with respect to the member 10 and to adjust the extent of projection of the ends 12 of the studs 11 from the member 10 as will be readily understood. A length of wire 14 having its ends secured in the ends of the member 10 as by means of the pins 15 for example (see Figure 3) is entrained over the grooves in the ends of the studs 11 to provide a reach spanning such ends as clearly indicated in Figure 2. Wire 14 is preferably piano wire although it will be understood that it may readily be replaced with other wire or with a length of flat band steel. Upon positioning of wire 14 in the device the same may be tightened by manipulation of the threaded nuts 13 to force the studs 11 radially outward in a direction to increase the intervals between the ends 12 and the adjacent wall of member 10.

The tool above described may be attached to a hand cultivator of the wheeled type in the manner illustrated in Figures 1 and 2. For this purpose, an angle member 16 may be provided and the tool attached to the horizontal web thereof by means of the studs 11, threaded nuts 17 being provided to engage the opposite surfaces of said horizontal web. The vertical web of angle member 16 may be adjustably connected to a pair of downwardly extending strips 18 and 19 which are connected at their upper ends with the side frame members 20 of the assemblage. In accordance with usual practice, a pair of end grip members 21 are attached to the upper end of members 20 while a supporting wheel 22 is journaled between the lower ends of these members. To brace members 18 and 19 members 20 are returned as shown at 23 to connect with the lower portions of the members 18 and 19. In this manner the tool of the invention is rigidly connected to the framework of the cultivator.

In the assembling and use of the apparatus described above the lower surface of the rounded member 10 is positioned approximately in horizontal alignment with the lowermost surface of the wheel 22 so that when the apparatus is moved along the surface of the ground by the usual stance of the operator the member 10 will scrape along the surface of the ground while the wire 14 is embedded in the ground the distance represented by the interval between the wire and member 10 and is moved laterally therethrough. The action of the wire 14 is found to loosen and break up the crust of the soil and also to pull out bodily any plants appearing in its path. The top soil is left in a loose pulverulent condition free from weeds and in proper condition to receive and retain water at the next rainfall. The depth of penetration of the wire 14 is effectively controlled by the substantial size of the member 10 which prevents its penetration into the soil but the rounded character of the member 10, nevertheless, does not impede the forward movement of the apparatus.

In Figure 3 the tool of the invention is illustrated as being mounted for manipulation on a conventional long handle herein designated by the reference numeral 25. For this purpose the tubular element of the tool, herein designated by the reference numeral 24, is attached to the handle 23' by a pair of brackets 25 only one of which shows on the drawing. It should be understood, however, that one of the brackets is positioned on each side of the handle 23'. Tubular member 24 is generally similar to the member 10 of Figures 1 and 2, the difference residing in the absence of apertures in the upper portion of the wall of the tubular member since the wire retaining studs need not pass entirely through the tubular member as they do in Figures 1 and 2. One such shortened stud is shown at 26 and to provide for the securing and adjusting of the stud threaded nuts 13 are screw threaded onto the stud both inwardly and outwardly of the side wall of the member 24.

In the further modified form of the tool shown in Figure 4 the principal frame of the tool is constructed from a centrally disposed conventional pipe T fitting 27 into which is screwed short lengths of pipe or nipples 28 to form the tubular structure of the frame. Into the laterally extending boss of the fitting 27 is screwed or otherwise rigidly secured a long handle 29 which is preferably of wood as will be understood. A pair of studs 26 are secured in the side walls of the pipes 28 adjacent their outer free ends and the cutting wire 14 is again entrained over the grooves formed in the lower ends of the studs to provide the reach spanning said ends in the manner more clearly illustrated in Figure 2. Figure 4 also illustrates a modified arrangement for securing the ends of the wire 14 and, as shown, the ends of the wire are twisted and looped over the end portions of the studs 26 which extend into the space within the pipes 28.

It should now be apparent that I have provided improved constructions for gardening tools which accomplish the objects initially set out. The mode of operation and advantages resulting therefrom of the assembly of Figures 1 and 2 is outlined above while the light weight and good balance of the hand tools of Figures 3 and 4 demonstrate their ease of manipulation. From inspection of Figures 3 and 4 it will be apparent that the angular relation between the studs 26 and the handles 23 (29) enables these tools to be readily manipulated by the user when standing erect. Also the symmetrical nature of the curved surfaces of the tubular members 24 and 28 enables the tools to be operated equally well in both forward and backward directions.

What I claim is:

1. A gardening tool comprising in combination a tubular member, a threaded stud extending radially downward through the side wall of said member adjacent each end of said member, said studs being aligned longitudinally of said member and each having a transverse groove in its lower end surface, a length of wire having its ends secured in the ends of said member and fitted within said grooves thereby providing a reach of wire spanning the lower ends of said studs, each of said studs having screw-threaded thereon a pair of nuts positioned on opposite sides of said side wall whereby the extent of projection of said studs may be varied and the tension in said reach thus controlled, and means to support said member for lateral movement in contact with the surface of the ground with said reach of wire being drawn sideways through the ground.

2. A gardening tool comprising in combination an elongated rounded support, a depending threaded stud slideably received in an aperture in said support adjacent either end thereof, said studs being aligned longitudinally of said support and each having a transverse groove in its lower end surface, a length of wire having its ends secured in the ends of said support and fitted within said grooves thereby providing a reach of wire spanning the lower ends of said studs, each of said studs having screw-threaded thereon a pair of nuts positioned on opposite sides of said support whereby the extent of projection of said studs may be varied and the tension in said reach thus controlled, and means mounting said support for lateral movement in contact with the surface of the ground with said reach of wire being drawn sideways through the ground.

3. A gardening tool comprising in combination an elongated support rounded in transverse section about its lower portion, a stud secured to and depending from each end of said support, said studs being aligned longitudinally of said support and each having a transverse groove in its lower end surface, a length of wire having its ends secured to said support and fitted within said grooves thereby providing a reach of wire spanning the lower ends of said studs, and means mounting said support for lateral movement with the curved surface thereof in contact with the surface of the ground while said reach of wire is drawn sideways through the ground.

4. A gardening tool comprising in combination an elongated support having a bottom surface rounded in transverse direction, a stud depending from either end of said support, said studs being aligned longitudinally of said support, a thin elongated cutter spanning the lower ends of said studs, and means mounting said support for lateral movement in contact with the surface of the ground while said cutter is drawn sideways through the ground.

5. A gardening tool comprising in combination an elongated support having a bottom surface rounded in transverse direction, a threaded stud depending from either end of said support and having sliding connection therewith, said studs being aligned longitudinally of said support, a thin elongated cutter having portions secured to said support and a further portion spanning the lower ends of said studs, screw-threaded means cooperating with said studs to vary the extent of projection of said studs from said support whereby the tension in said further portion of said cutter may be controlled, and means mounting said support for lateral movement in contact with the surface of the ground while said further portion of said cutter is drawn sideways through the ground.

6. A gardening tool comprising in combination a tubular member, a stud attached to and depending from each end of said member, a length of wire having its ends secured to said member and its center portion entrained over the lower ends of said studs to provide a thin taut cutter spanning the lower ends of said studs, a pair of brackets secured to the center portion of said tubular member in angularly disposed relation to said studs, and a handle having its lower end secured between said brackets.

7. A gardening tool comprising in combination a T-shaped pipe fitting having a handle secured in and extending outwardly from the centrally disposed opening therein, a length of pipe secured in and extending outwardly from each of the other openings of said fitting, a stud depending downwardly from the outer end of each of said pipe lengths, and a thin taut cutter spanning the lower ends of each of said studs.

8. A gardening tool comprising in combination a wheel, a frame on which said wheel is journaled having a portion inclined upwardly substantially in the plane of rotation of said wheel, a pair of end grip members on the upper end of said portion, an elongated support having a bottom surface rounded in transverse direction secured to another portion of said frame and disposed substantially parallel with the axis of rotation of said wheel, a stud depending from either end of said support, and a thin elongated cutter spanning the lower ends of said studs.

EDWARD TERRAY.